United States Patent [19]

Diessner

[11] Patent Number: 5,714,694
[45] Date of Patent: Feb. 3, 1998

[54] FORCE MEASURING INSTRUMENT WITH OVERLOAD PROTECTION

[76] Inventor: Carmen Diessner, Furtwanger Strasse 9, 71034 Boblingen, Germany

[21] Appl. No.: 684,914

[22] Filed: Jul. 22, 1996

[30] Foreign Application Priority Data

Jul. 21, 1995 [DE] Germany .................. 195 26 653.6

[51] Int. Cl.$^6$ ........................................ G01L 1/00
[52] U.S. Cl. .................................... 73/862.632
[58] Field of Search .................. 73/862.632, 862.629, 73/862.631, 862.634, 862.637, 862.639, 862.633, 862.638, 862.627

[56] References Cited

U.S. PATENT DOCUMENTS

| | | | |
|---|---|---|---|
| 4,411,159 | 10/1983 | Spear et al. | 73/862.632 X |
| 4,949,799 | 8/1990 | Wernimount | 73/862.634 X |
| 5,109,707 | 5/1992 | VanGerpen | 73/862.637 |
| 5,263,375 | 11/1993 | Okada | 73/862.637 X |
| 5,265,470 | 11/1993 | Kaiser et al. | 73/862.634 X |
| 5,423,227 | 6/1995 | Polaert et al. | 73/862.634 X |
| 5,488,873 | 2/1996 | Delmas et al. | 73/862.637 X |
| 5,510,784 | 4/1996 | Polaert et al. | 73/862.634 X |

Primary Examiner—Elizabeth L. Dougherty
Attorney, Agent, or Firm—Browdy and Neimark

[57] ABSTRACT

A force measuring instrument having at least one force sensor (16) and one force pickup element (13) resting directly or indirectly in spring-loaded fashion on the force sensor. A spring assembly (17; 25-28) is provided that presses the force pickup element (13; 23) against the at least one force sensor (16; 19-22) with a maximum force value to be measured. The direction of the force to be measured and acting upon the force pickup element (13; 23) is oriented counter to the force of the spring assembly (17; 25-28). As a result, when a force is exerted upon the force pickup element (13), the overall force action on the force sensor (16) is reduced, thus precluding the possibility of damage to or destruction of the force sensor by an excessive incident force.

20 Claims, 1 Drawing Sheet

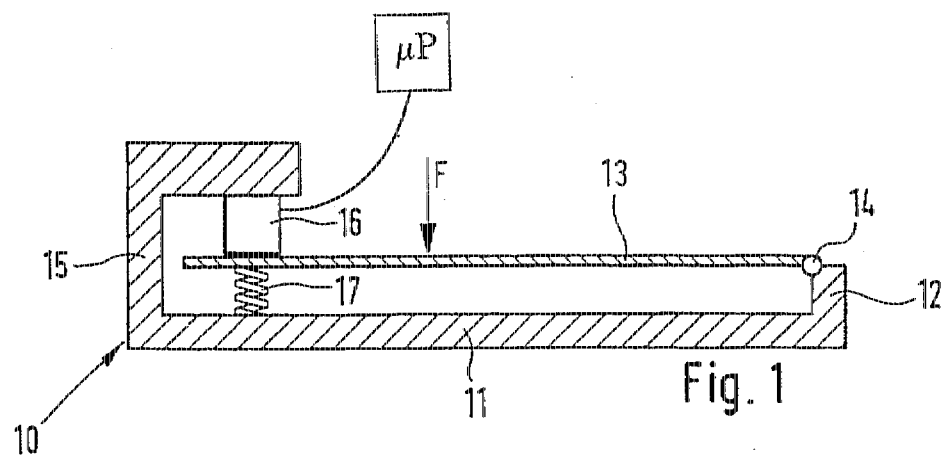
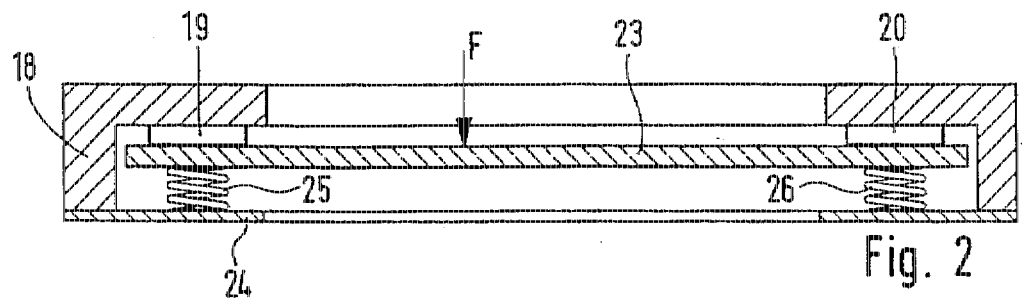
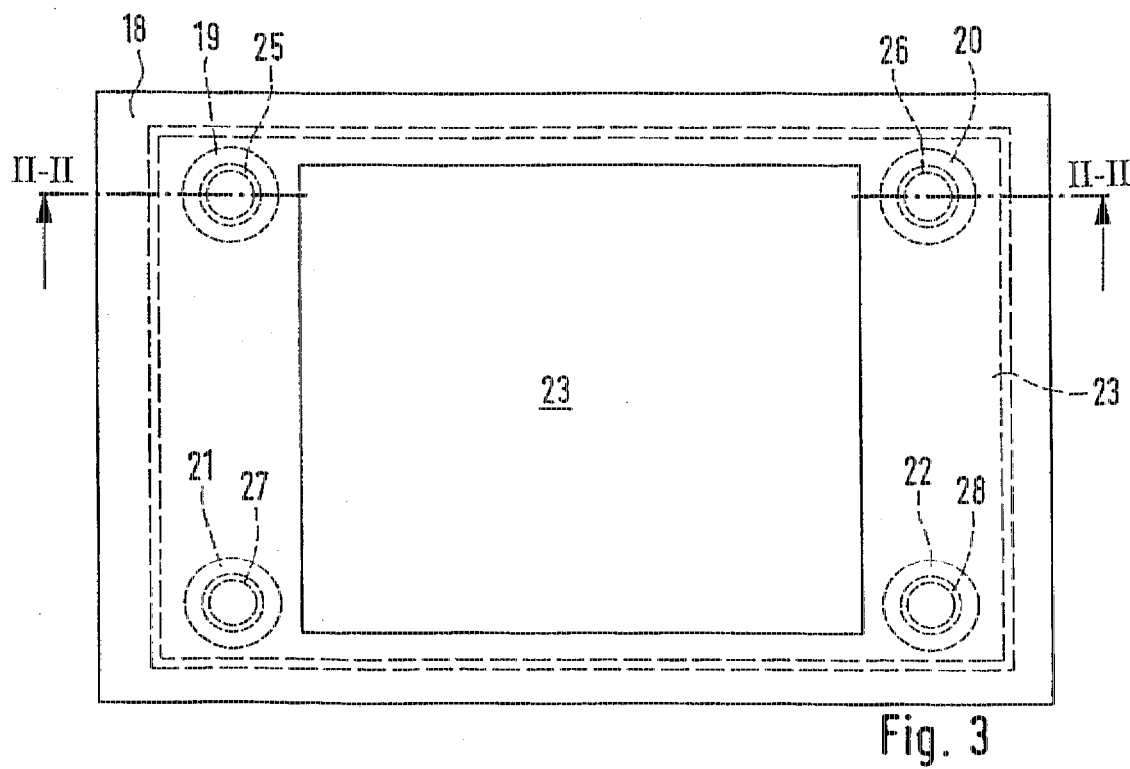

FORCE MEASURING INSTRUMENT WITH OVERLOAD PROTECTION

FIELD OF THE INVENTION

The invention relates to a force measuring instrument having at least one force sensor and one force pickup element resting directly or indirectly in spring-loaded fashion on the force sensor; more particularly, to such a force measuring instrument in which the force pickup element is a touch-screen plate.

BACKGROUND OF THE INVENTION

One such force measuring instrument, embodied as a sensor pickup mechanism for a touch-sensitive plate, is known for instance from German Utility Model DE-GM 94 04 488. In the known device, a plate rests on four force sensors on the four corners of a frame and is elastically resiliently retained on these force sensors. If a force is exerted at a certain point on the plate, then the four force sensors are pressed variously markedly, depending on the position of the force action, so that four measurement values are generated from which the position of the force action can be ascertained. Such a device is used for instance as a touch-sensitive screen accessory and is also known as a touch screen. The greater the force action, the more the force sensors are loaded. This has the disadvantage that if the plate is hit, for instance, the force action becomes so great that one or more sensors are damaged or destroyed. This applies to other force measuring instruments as well in which the force sensors are arranged accordingly.

SUMMARY OF THE INVENTION

Accordingly, the present invention has an object, among others, to overcome deficiencies in the prior art such as noted above.

One object of the present invention is thus to improve such a force measuring instrument such that even in the event of major force actions, such as blows, on the respective force pickup element, damage to or destruction of the force sensors is effectively prevented.

According to the invention, this object is attained in that a spring assembly is provided that presses the force pickup element against the at least one force sensor with a maximum force value to be measured, and that the direction of the force to be measured and acting upon the force pickup element is oriented counter to the force of the spring assembly.

In the force measuring instrument of the invention, the at least one force sensor is thus relieved or in other words protected when the incident force becomes greater. Blows and impacts on the force pickup element do not negatively affect the force sensor but instead bring about a complete force relief of it. By means of a relatively simple and inexpensive arrangement, reliable protection against damage to the at least one force sensor is therefore achieved.

In an expedient structural feature of the invention, a retaining device that supports the force sensor on the one hand and the spring assembly on the other hand, acting in opposite directions, is provided, which in particular has an essentially U-shaped or rectangular profile.

Depending on the application, the force pickup element may be embodied as a lever or plate element that is supported both between the force sensor and the spring assembly and on at least one further retention point, preferably being pivotably supported. As a result, it is also possible in the force measurement to utilize the lever action of the force pickup element.

In a preferred embodiment, for a touch-screen-like application of the kind described above in conjunction with the known art, in the force measuring instrument of the invention the retaining device is embodied as a rectangular frame of substantially U-shaped profile, and the force pickup element is embodied as a plate that engages the rectangular frame; a force sensor and a spring element are disposed at least in each corner region, and the spring elements form the spring assembly. As a result, not only are the force sensors protected against major force actions and blows, but the plate itself, which in this application is preferably of glass or some other transparent material, is also protected, since it is pressed elastically against the spring elements by force action.

To simplify assembly, the U-shaped profile can be made up of an angle frame element and a support plate, which can for instance be easily screwed together or secured in some other detachable way to form the U-shaped profile.

To determine the touch coordinates on the platelike force pickup element, a program-controlled computer that calculates these coordinates from the measured force values is preferably used. In particular, it may have means for eliminating nonlinear influences on the calculation of the touch coordinates.

Suitable examples of force sensors include most force/voltage transducers, especially strain gauges, piezo elements, or the like.

The spring elements may in particular be spiral springs, cup spring assemblies, leaf springs, or elastomer elements.

BRIEF DESCRIPTION OF THE DRAWING

The above and other objects and the nature and advantages of the present invention will become more apparent from the following detailed description. Two exemplary embodiments of the invention are shown in the drawing and described in further detail in the ensuing description. Shown are:

FIG. 1, an elevational longitudinal sectional view of a force measuring instrument according to a first exemplary embodiment;

FIG. 2, an elevational longitudinal sectional view according to a second exemplary embodiment, taken along line II—II of FIG. 3 and showing a sensor pickup mechanism for a touch-sensitive plate for determining the position of a touch of the plate by force action; and FIG. 3 a plan view of the exemplary embodiment of FIG. 2.

DETAILED DESCRIPTION OF THE PREFERRED EMBODIMENT

In the force measuring instrument shown in FIG. 1, a retaining device 10 comprises a base plate 11, which on one side has an upright pivot mount 12 on which a force pickup lever 13 is pivotably supported via a joint 14. Instead of a force pickup lever 13, a force pickup plate may be used. On the opposite side of the base plate 11, its peripheral region has a U-shaped profile 15 and the force pickup lever 13 engages between the two legs of the U. On the upper leg of the U-shaped profile 15, a force sensor 16 is mounted, against which the force pickup lever 13 is pressed by the force of a helical spring 17 that is supported on the lower leg of the U-shaped profile 15, that is, on the base plate 11.

The force sensor 16 may be a known strain gauge or an array of strain gauges or a piezo element. Instead of a helical spring 17, some other spring assembly may be used, such as a cup spring assembly, a leaf spring or an elastomer element.

In the position of repose, the force of the prestressed helical spring 17 acts upon the force sensor 16. This force at this time represents the maximum force to be measured. Now if a force F is exerted from above upon the force pickup lever 13, this force acts counter to the spring force of the helical spring 17, so that as the force F increases the force sensor 16 is relieved more and more. The following relationship applies:

$$F_{sensor} = F_{spring} - F.$$

In this equation, it has been assumed for the sake of simplicity that the force F acts at the point of the force sensor 16 or the helical spring 17. In the case shown, the lever action (leverage) of the force pickup lever 13 must also be taken into account and depends on the point of application of the force F.

Between the force pickup lever 13 and the force sensor 16, an additional elastic element or spring element that also transmits the applied force can be disposed as well, in order to prevent complete lifting away or complete force decoupling between the force pickup lever 13 and the force sensor 16.

In FIGS. 2 and 3, an exemplary application of the force measuring instrument shown in its basic form in FIG. 1 is shown. This example is a touch-sensitive screen accessory (touch screen), which serves to inform the computer of positions on computer screens by touching the screen with a finger or a marking stylus.

This screen accessory comprises a rectangular frame 18 of L-shaped profile, on each of the four corner regions of which is mounted one of force sensors 19–22; from the viewpoint of the observer, the force sensor is concealed by the upper leg of the rectangular frame 18. A plate 23 of glass or other transparent material is placed as the force pickup element in this rectangular frame 18; the insertion opening is defined by the vertical legs of the rectangular frame 18. The rectangular frame 18 is closed off at the rear (at the bottom as seen in FIG. 2) by a support plate 24, on which four helical springs 25–28 are arranged such that they each press the plate 23 against the force sensors at points directly opposite the force sensors 19–22. The support plate 24 has a rectangular center cutout to allow one to look through to a screen located behind it.

The mode of operation of this embodiment is fundamentally equivalent to that of the exemplary embodiment shown in FIG. 1; that is, by means of the helical springs 25–28, the plate 23 is pressed with maximum force against the force sensors 19–22, so that in the state of repose these sensors output electrical measurement signals that correspond to the maximum possible force values. If the plate 23 is touched at a certain position under force action (force F, FIG. 2), then the force sensors 19–22 are relieved by forces of various strengths, depending on the position of the point touched, so that different measurement signals are generated. The touch coordinates are ascertained via equations, as described in the prior disclosure discussed above. For evaluating the measured values and corresponding calculation of the touch coordinates, a program-controlled computer is used (shown in FIG. 1, labeled µP). The computer program may also have means for eliminating nonlinear influences on the calculation of the touch coordinates.

The equations mentioned above are conventional and are based on the ratios of the force components at each of the force sensors. The decreases of the force measured at all of the force sensors, when added together, equal the force exerted on the touch screen by the finger or stylus. The ratios of the force decreases at the various force sensors (as opposed to the absolute values), however, are determined by the position of the finger or the stylus, and are independent of the total force exerted. In FIG. 3, for example, by comparing the sum of the forces measured at force sensors 19 and 20 with the sum of the forces measured at sensors 21 and 22, the vertical location of the finger or stylus can be determined. The ratio of the two sums of forces is equal to the proportion of the distances between the finger or stylus and each of the horizontal lines joining the sensors (i.e., line II—II and a line between the centers of sensors 21 and 22. A similar relationship holds for the horizontal position. Thus, the equations used to find the position of touch are those of simple levers, easily derived and programmed by those skilled in the art.

The arrangement shown in FIGS. 2 and 3 can also be used for other purposes; for instance, it may be embodied as a keyboard or other input device for computers or the like. In such a case, the support plate 24 is embodied as a closed, continuous plate and carries appropriate operator control symbols. When the corresponding position above them on the plate 23 is actuated, a corresponding function in the computer is tripped.

This arrangement is also suitable for inputting graphic illustrations into a computer; the graphic illustration is transferred to the plate 23, for instance by means of a writing wand or the like. The computer can calculate each point on the trace of the wand by the signals from the force sensors 19–22 at that point.

The exemplary embodiments shown in FIGS. 1 and 2 may naturally also have seals, of the kind shown and described in the prior disclosure discussed above. Moreover, the plate 23 can be embodied in stairstep fashion, e.g. with a stepped border, in such a way that it substantially also fills up the frame opening between the upper legs of the rectangular frame 18, making a flush surface. This, too, is described in further detail in the prior disclosure discussed above.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. The means and materials for carrying out various disclosed functions may take a variety of alternative forms without departing from the invention. It is to be understood that the phraseology or terminology employed herein is for the purpose of description and not of limitation.

What is claimed is:

1. A force measuring instrument having at least one force sensor and one force pickup element resting directly or indirectly in spring-loaded fashion on the force sensor, wherein a spring assembly (17; 25–28) is provided that presses the force pickup element (13; 23) against the at least one force sensor (16; 19–22) with a maximum force value to be measured, and wherein the direction of the force to be measured and acting upon the force pickup element (13; 23) is oriented counter to the force of the spring assembly (17; 25–28), wherein the force pickup element (13; 23) is embodied as one of a lever and plate element that is supported both between the force sensor (16; 19) and the spring assembly (17; 25) and on at least one further retention point (14; 20–22, 26–28).

2. The force measuring instrument of claim 1, wherein a retaining device (15; 18, 24) is provided that supports the force sensor (16; 19–22), on the one hand, and the spring assembly (17; 25–28), on the other, in opposite directions.

3. The force measuring instrument of claim 2, wherein the retaining device (18, 24) is embodied as a rectangular frame of substantially U-shaped profile, and the force pickup element (23) is embodied as a plate that engages the rectangular frame; a force sensor (19–22) and a spring element (25–28) are disposed at least in each corner region, and the spring elements (25–28) form the spring assembly.

4. The force measuring instrument of claim 3, wherein the U-shaped profile is made up of an angle frame element (18) and a support plate (24).

5. The force measuring instrument of claim 3, characterized by a program-controlled computer that calculates touch coordinates on the force pickup element (23) from the measured force values.

6. The force measuring instrument of claim 5, wherein the computer has means for eliminating nonlinear influences on the calculation of the touch coordinates.

7. The force measuring instrument of claim 2, wherein the retaining device (15; 18, 24) has a substantially U-shaped or rectangular profile.

8. The force measuring instrument of claim 1, wherein the force pickup element (13) is disposed pivotably on the at least one further retention point (14).

9. The force measuring instrument of claim 1, wherein the force pickup element (23) comprises glass or some other transparent material.

10. The force measuring instrument of claims 1, wherein a force/voltage transducer, in particular a strain gauge array, a piezo element or the like, is provided as the force sensor (16; 19–22).

11. The force measuring instrument of claim 1, wherein the spring assembly (17; 25–28) is embodied as a helical spring assembly, a cup spring assembly, a leaf spring assembly, or an elastomer element assembly.

12. The force measuring instrument of claim 2, wherein a seal is provided between the force pickup element and the retaining device.

13. A force measuring instrument having at least one force sensor and one force pickup element resting directly or indirectly in spring-loaded fashion on the force sensor, wherein a spring assembly (17; 25–28) is provided that presses the force pickup element (13; 23) against the at least one force sensor (16; 19–22) with a maximum force value to be measured, and wherein the direction of the force to be measured and acting upon the force pickup element (13; 23) is oriented counter to the force of the spring assembly (17; 25–28), wherein a retaining device (15; 18, 24) is provided that supports the force sensor (16; 19–22) and the spring assembly (17; 25–28) in opposite directions, wherein the retaining device (18, 24) is embodied as a rectangular frame of substantially. U-shaped profile, and the force pickup element (23) is embodied as a plate that engages the rectangular frame; a force sensor (19–22) and a spring element (25–28) are disposed at least in each corner region, and the spring elements (25–28) form the spring assembly.

14. The force measuring instrument of claim 13, wherein the force pickup element (13; 23) is embodied as one of a lever and plate element that is supported both between the force sensor (16; 19) and the spring assembly (17; 25) and on at least one further retention point (14; 20–22, 26–28).

15. The force measuring instrument of claim 13, wherein the retaining device (15; 18, 24) has a substantially U-shaped or rectangular profile.

16. The force measuring instrument of claim 13, wherein the force pickup element (13) is disposed pivotably on the at least one further retention point (14).

17. The force measuring instrument of claim 13, wherein the U-shaped profile is made up of an angle frame element (18) and a support plate (24).

18. The force measuring instrument of claim 13, characterized by a program-controlled computer that calculates touch coordinates on the platelike force pickup element (23) from the measured force values.

19. The force measuring instrument of claim 18, wherein the computer has means for eliminating nonlinear influences on the calculation of the touch coordinates.

20. The force measuring instrument of claim 13, wherein the force pickup element (23) comprises glass or some other transparent material.

* * * * *